Sept. 25, 1956 E. H. BENEDICK 2,764,016
DEW POINT TEMPERATURE MEASURING DEVICE
Filed Jan. 21, 1953 2 Sheets-Sheet 2
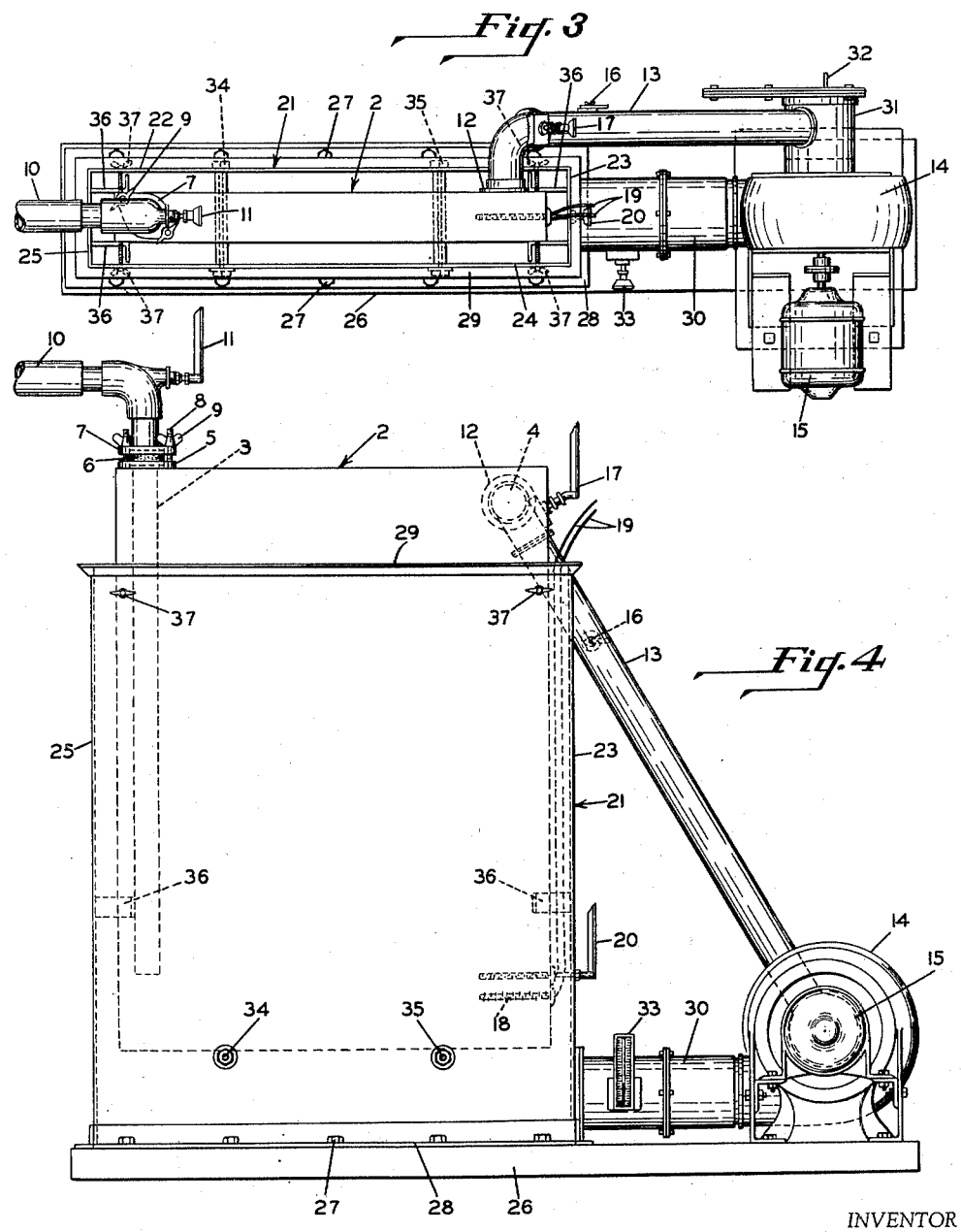
INVENTOR
EDWARD H. BENEDICK
by
Walter + Kaufman
ATTORNEY

United States Patent Office 2,764,016
Patented Sept. 25, 1956

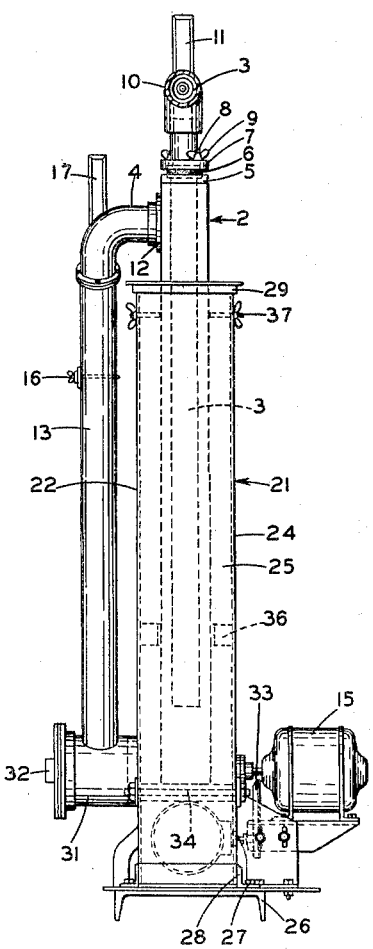
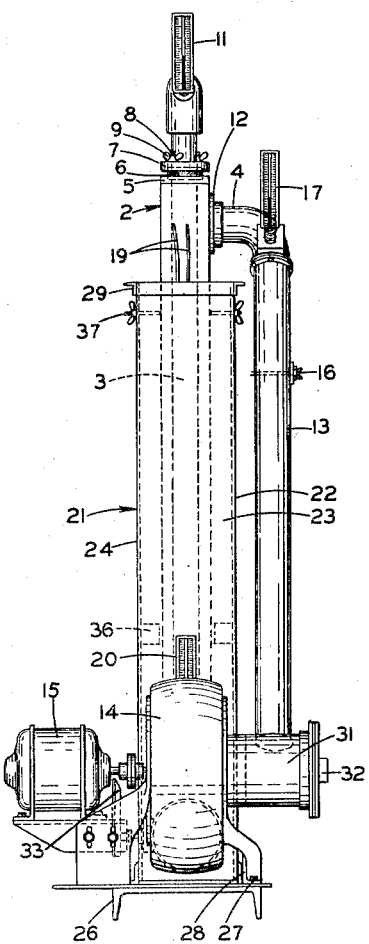

2,764,016

DEW POINT TEMPERATURE MEASURING DEVICE

Edward H. Benedick, West Lampeter Township, Lancaster County, Pa., assignor to Armstrong Cork Company, Lancaster, Pa., a corporation of Pennsylvania Application January 21, 1953, Serial No. 332,188

2 Claims. (Cl. 73—17)

This invention relates to a dew point temperature measuring device. It is concerned more particularly with a device for measuring dew point temperatures under conditions where the ambient temperature of the gas to be measured is outside of the ambient temperature-dew point temperature range of the dew point temperature measuring element.

As is well known, dew point temperature measuring elements are accurately operable only within a limited ambient temperature-dew point temperature range. Frequently, the ambient temperature-dew point temperature relationship is such that accurate dew point temperature measurements can be obtained only if the ambient temperature of the gas is reduced or, less frequently, increased. For instance, in curing stoves for vinyl plastic floor coverings, the ambient temperature of the gas may be 130° F. to 250° F. and the dew point temperature in the order of 40° F. The dew point temperature measuring element may be accurately operable over an ambient temperature range not exceeding about 110° F. with a dew point temperature of about 40° F. It is necessary, therefore, to reduce the ambient temperature of the gas at the dew point measuring element to a temperature not exceeding about 110° F. but above 40° F. Reduction of the ambient temperature of the gas to about 100° F. at the dew point temperature measuring element will give accurate results.

The present invention provides a device by which the ambient temperature of the gas at the dew point temperature measuring element may be adjusted and controlled and a rapid rate of heat exchange at the zone of the measuring element may be effected if necessary.

An object of the present invention is to provide a dew point temperature measuring device which may be readily controlled to bring the ambient temperature of the gas to be measured within the ambient temperature-dew point temperature range of the dew point temperature measuring element.

Another object of the invention is to provide a dew point temperature measuring device in which there is incorporated a heat exchanger for rapidly controlling the ambient temperature of the gas to be measured.

A further object of the invention is to provide a dew point temperature measuring device in which a fan is provided for continuously drawing gas to be measured into a casing containing a dew point temperature measuring element and for exhausting said gas together with heat exchange fluid, such as air, into heat exchange relationship with the casing to bring the ambient temperature of the gas within the casing at the dew point measuring element within the operating range of the element.

Other objects of the invention will be apparent from consideration of the following description of an embodiment of the invention which is illustrated in the accompanying drawings, in which:

Figure 1 is a front elevational view of a dew point temperature measuring device of this invention;

Figure 2 is a rear elevational view of the device;

Figure 3 is a top plan view of the device; and

Figure 4 is a side elevational view of the device.

The device comprises a gastight casing 2 having an inlet 3 and an outlet 4 for the delivery and withdrawal of gas, the dew point temperature of which is to be determined. The inlet 3 is preferably arranged so that the point of entrance of the gas into the casing may be adjusted. In the embodiment illustrated the casing 2 is provided with a flange 5 which is welded to the metal top of the casing. An annular gasket 6 of cork or other compressible material is received within an annular recess in flange 5 and in an annular clamping plate 7. Threaded studs 8 project from flange 5 and pass through openings in clamping plate 7. Wing nuts 9 are threaded on the studs 8 and when drawn down serve to compress the gasket 6 between the flange 5 and clamping plate 7, causing the same to seal against the outer surface of the conduit which constitutes inlet 3. Adjustment of the inlet 3 is effected by loosening the nuts 9, sliding the conduit to the desired position, and reclamping by drawing down the nuts 9. A flexible conduit 10 may be used to connect the inlet conduit to the source of gas to be examined. For instance, the dew point measuring device may be located outside of a linoleum or vinyl plastic floor covering curing oven and the flexible conduit 10 lead into the oven at the desired location. A thermometer 11 may be positioned in the inlet line 3 to inform the operator of the temperature of the entering gas.

The outlet 4 is preferably disposed adjacent to the top of the casing 2 at a location remote from the inlet 3. In the embodiment illustrated the outlet is defined by a pipe flange 12 which is welded to casing 2 and receives a conduit arrangement 13 which leads to the intake side of a fan or other suction device 14 driven by a motor 15. A fan is preferably employed and serves a dual function as will be more fully hereinafter described.

A control device 16 which may be in the form of a movable damper is provided in conduit 13 to adjust the volume of gas withdrawn from the casing 2 by the fan 14. A thermometer 17 may be positioned in the outlet conduit to inform the operator of the temperature of the gas at the point of exhaust from the casing 2.

A dew point temperature measuring element 18 is disposed within the casing 2 adjacent to the bottom thereof and at a location remote from the inlet 3. This element may be a "Dewcel" manufactured by The Foxboro Company of Foxboro, Mass., or other dew point temperature measuring element. Leads 19 extend from the element 18 to a suitable indicating or recording instrument, not shown. A thermometer 20 may be positioned within casing 2 close to the dew point temperature measuring element 18 to inform the operator of the temperature of the gas at the element 18.

An arrangement for cooling the gas in casing 2 is provided in accordance with the present invention. It comprises a housing 21 which is provided with side walls 22, 23, 24, and 25 and is closed at the bottom by a base member 26, the housing being attached to the base member by bolts 27 passing through angle iron flanges 28 secured to the walls of the housing 21. A reinforcing angle iron flange 29 may be provided around the open top of the housing 21.

The housing 21 is provided with an inlet opening adjacent to the bottom thereof through which cooling fluid may be introduced. Preferably the inlet opening in the housing is connected by a conduit 30 to the exhaust outlet of fan 14. The inlet side of fan 14 is connected to outlet conduit 13 of casing 2 as previously mentioned and is also open to the atmosphere through an inlet header 31 into which conduit 13 leads and an adjustable slide controls the inlet orifice. The slide 32 is effective for controlling the area of the inlet opening for the entrance of air into the fan housing. A thermometer 33 may be positioned in the conduit 30 leading to the housing 21 to inform the operator of the temperature of the cooling air. The cooling air enters the housing 21 below the bottom of casing 2 and travels upwardly, bathing the walls of the casing. This tends to cool the gas in the lower portion of the casing surrounding the dew point measuring element 18 more rapidly than the gas in the upper portion of the casing.

The casing is supported in spaced relationship to the housing on a pair of through bolts 34 and 35 which pass through the lower portion of the housing above the bottom thereof. Corner brackets 36 welded to the casing and positioned as shown in Figures 3 and 4 serve to properly space the casing from the housing, and clamping screws 37 which are threaded through the housing 21 and abut against the casing 2 hold the casing against movement.

In the operation of the device, the inlet 3 is connected as by a flexible metal tube 10 or other conductor to the chamber or other area from which the gas to be measured is to be taken. The motor 15 for the fan 14 is started and the gas is sucked from the chamber into the casing 2 through inlet 3 and is exhausted from the casing 2 to the fan 14 through conduit 13. Air is delivered from the fan together with the exhausted gas from the chamber to the housing 21, cooling the gas in the casing 2. The operator notes the temperature of the thermometer 20 at the dew point temperature measuring element 18; and, if it is within the operating ambient temperature-dew point temperature range of the dew point temperature measuring element 18, no adjustment is necessary. If the temperature indicated by thermometer 20 is above the desired range, the inlet 3 may be raised so that the hot gas enters and leaves the casing near the top. Dew point temperatures measurement depends only upon absolute humidity and is, therefore, independent of the gas temperature so long as the ambient temperature of the gas at the measuring element is above the dew point temperature and within the upper limit of the range referred to. This permits great flexibility as to initial gas temperature and the quantity of gas that can be handled, for a large temperature differential may exist between the top and bottom of the casing, the temperature at the measuring element only being significant. This permits the use of a relatively small unit for a wide variety of applications. Where the temperature indicated by the thermometer 20 is below that desired, the gas may be inletted close to the bottom of the casing by adjustment of the inlet 3. The position that will provide the proper ambient gas temperature within the range of the measuring element 18 usually may be attained by adjustment of the inlet 3. However, additional control may be effected through use of the damper 16 in the exhaust line 13 from the casing, or the slide control 32 in the inlet from the atmosphere to the fan, or both. Should it be necessary to elevate the temperature of the air delivered to the housing 21 by the fan 14, an electric heating element may be provided in the system to heat the air which is delivered to the housing. The use of a fan effects a rapid rate of heat exchange. However, other heat exchange arrangements may be provided.

I claim:
1. In a heat exchanger for use with a dew point temperature measuring device responsive to the absolute humidity of gas delivered into contact therewith for measuring the dew point of said gas, said measuring device being accurately operable over a limited ambient temperature range above the dew point temperature of the gas to be measured, the combination of a closed casing having an inlet opening and a discharge opening therein disposed adjacent to the top thereof, an inlet conduit received within said inlet opening and adjustable vertically within said casing to vary the position at which gas is inletted into said casing, means for securing said adjusable inlet conduit in adjusted position, a discharge conduit connected to said casing at said discharge opening therein, a suction fan connected to said discharge conduit for sucking gas into said casing through said inlet conduit and for discharging said gas from said casing through said discharge conduit, means in said discharge conduit for controlling the rate of discharge of gas from said casing, and means for adjusting the temperature of the gas to be measured at said measuring means within said casing to a desired value within said limited range of said measuring means, including a housing surrounding a portion at least of said casing, means for delivering heat exchange fluid to the space between said housing and said casing comprising a conduit conducting air to said fan from outside of said casing, and means in said air-conducting conduit for controlling the rate of intake of air by said fan for delivery to the surface of said casing.

2. In a heat exchanger for use with a dew point temperature measuring device responsive to the absolute humidity of gas delivered into contact therewith for measuring the dew point of said gas, said measuring device being accurately operable over a limited ambient temperature range above the dew point temperature of the gas to be measured, the combination of a gastight casing having an inlet opening and a discharge opening, an inlet conduit adjustably received within said inlet opening in said casing, means for securing said adjustable inlet conduit in adjusted position within said casing, a discharge conduit leading from said discharge opening in said casing, means for adjusting the temperature of the gas to be measured at said measuring means within said casing to a desired value within said limited range of said measuring means, including a housing surrounding a portion at least of said casing, means connected to said discharge conduit for withdrawing gas from within said casing and delivering it together with make-up cooling air to the space between said housing and said casing and for drawing gas to be measured into said casing through said inlet conduit, and means for controlling the feed-back of gas from within the casing to the cooling air for delivery to said housing.

References Cited in the file of this patent
UNITED STATES PATENTS

| 1,649,610 | McGuame | Nov. 15, 1927 |
| 2,566,307 | Boyle | Sept. 4, 1951 |
| 2,629,253 | Deaton | Feb. 24, 1953 |